April 13, 1965  R. GOTTSCHALD  3,178,209
BALL AND SOCKET JOINT
Original Filed Sept. 22, 1959
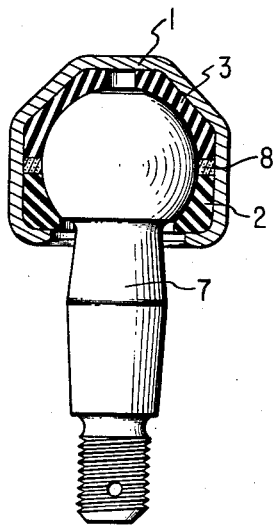
INVENTOR.
RUDOLF GOTTSCHALD 3,178,209
BALL AND SOCKET JOINT
Rudolf Gottschald, Osterrath, near Dusseldorf, Germany, assignor to Viktor Langen, trading as A. Ehrenreich & Cie., Dusseldorf-Oberkassel, Germany
Original application Sept. 22, 1959, Ser. No. 841,535, now Patent No. 3,073,634, dated Jan. 15, 1963. Divided and this application Feb. 28, 1962, Ser. No. 182,702
Claims priority, application Germany, Sept. 24, 1958, E 16,477
2 Claims. (Cl. 287—87)

This invention relates to improvements in ball and socket joints of the kind comprising a ball casing, a ball bolt and at least two bearing cups enclosing the head of the bolt. This application is a division of application Serial No. 841,535 filed September 22, 1959, now Patent 3,073,634 entitled Ball Socket Joint.

The object of the invention is the lubrication of the head to increase the period of time between inspections, whereby it is possible to improve still further an already proposed joint having a bearing cup of plastic material requiring little attention.

According to the invention a part of the covering of the ball bolt head is formed by a porous insert, for example, of foamed material, felt or the like filled with lubricant. As the bearing cups are usually spring loaded and on loading therefore can yield to a certain amount there is a pumping action, whereby a film of lubricant is provided between the surfaces sliding on one another.

A further object of the invention is the lubrication of the porous or felt ring to provide the lubricant for the surfaces.

The invention will be described with reference to the accompanying drawing showing a vertical section of the invention.

In accordance with this invention, the ball joint consists of a ball casing 1, two bearing cups 2, 3, and a ball bolt 7. The head of the ball bolt rotates in the bearing cups 2, 3.

The bearing cups 2, 3 may be formed of elastically resilient synthetic material between the impact surfaces of which a porous lubricant impregnated insert 8 of annular shape, is mounted, thereby further improving the favourable lubricating properties of the ball joint. With every loading the ball cups are slightly deformed whereby lubricant is continuously pressed out of the insert 8 to provide a film between the bearing surfaces.

A lubricating nipple for the insert material 8 may be provided.

The porous insert 8 holds the lubricant substantially longer than a hollow space without insert. In this way, a joint requiring little attention is obtained which requires a fresh filling of grease only at very long intervals of time, and joints with synthetic material bearing cups requiring no attention are on the other hand further improved in respect of a prolongation of their life.

I claim:
1. A ball and socket joint comprising a ball casing, a ball bolt, a head on said bolt, at least two spaced resilient bearing cups surrounding said bolt head and mounted in said casing in bearing surface contact with said head, said bearing cups being elastically deformable under normal working loads of said ball and socket joint, and an insert of resilient porous material impregnated with lubricant and constituting the sole source of lubrication for said joint, said insert comprising a ring between the adjacent impact faces of said bearing cups whereby the deformation of said bearing cups during the operation of said joint compresses said insert to effect a pumping action upon said insert and supply lubricant to the bearing surfaces of both said cups and said bolt head.

2. A ball and socket joint comprising: a ball casing, a ball bolt, a head on said bolt, said head being rotatable and translationally movable within said casing, at least two spaced resilient bearing cups mounted within said casing and engaging said head in bearing surface contact therewith, said bearing cups resiliently bearing against said head and being elastically deformable under normal working loads of said ball and socket joint, at least a portion thereof being compressed by said translational movement of said head within said casing, and an insert of resilient porous material impregnated with lubricant disposed between and engaging opposed surfaces of said spaced bearing cups and constituting the sole source of lubrication for the joint, said displacement of the bearing cups caused by said translational movement of said head compressing the insert to provide a pumping action thereon and supply lubricant to the bearing surfaces of both said cups and head.

References Cited in the file of this patent
UNITED STATES PATENTS

| 1,520,862 | Faudi | Dec. 30, 1924 |
| 2,921,809 | Kogstrom | Jan. 19, 1960 |